UNITED STATES PATENT OFFICE.

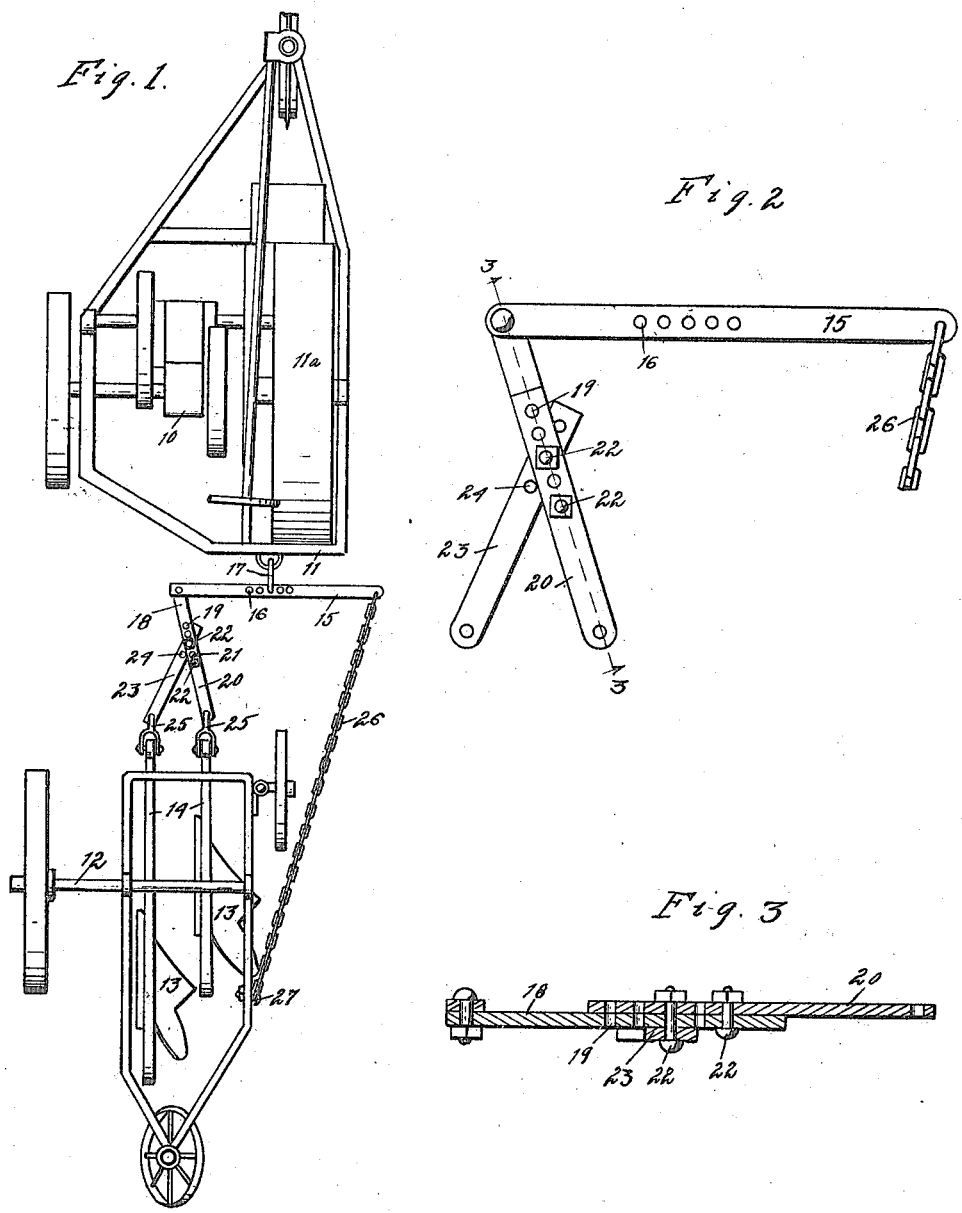

SCOTT C. DERBY AND EMIL PETERSEN, OF AVOCA, IOWA.

PLOW-HITCH FOR TRACTORS.

1,184,728.    Specification of Letters Patent.    Patented May 30, 1916.

Application filed May 25, 1915. Serial No. 30,458.

*To all whom it may concern:*

Be it known that we, SCOTT C. DERBY and EMIL PETERSEN, citizens of the United States, and residents of Avoca, in the county of Pottawattamie and State of Iowa, have invented a certain new and useful Plow-Hitch for Tractors, of which the following is a specification.

The object of our invention is to provide a plow hitch of simple, durable and inexpensive construction, especially adapted for tractors of the type employing one main traction wheel designed to travel in the furrow.

A further object is to provide such a hitch, whereby the plow beams may be hitched to the tractor somewhat out of line with the plow draw bar and out of line with the traction wheel in such a way as to produce a minimum strain on the parts of the machine.

Still a further object is to provide such a hitch capable of ready and easy adjustment for accommodating the machine to various field conditions.

A further object is to provide such a hitch so constructed and arranged as to engage a plow or plows at the side thereof rearwardly of the forward ends of the beam or beams, so as to prevent lateral swinging of the plow on a side hill.

Our invention consists in the construction, arrangement and combination of the various parts of the device whereby the objects contemplated are attained as hereinafter more fully set forth, pointed out in our claim and illustrated in the accompanying drawings, in which:

Figure 1 shows a top or plan view of a tractor and two beam gang plow equipped with a hitch embodying our invention. Fig. 2 shows a top or plan view of the hitch, and Fig. 3 shows a vertical sectional view taken on the line 3—3 of Fig. 2.

In the accompanying drawings, I have used the reference numeral 10 to indicate generally a tractor of the type having a large traction wheel 11ª designed to travel in a furrow when the tractor is used for plowing.

The tractor 10 has a draw bar 11. Rearwardly of the tractor 10 is a two beam gang plow 12 having the plows 13 with the beams 14. The plows are suitably mounted on the frame in any suitable way.

Our improved hitch comprises a bar 15 having between its ends a plurality of openings 16, whereby the bar 15 is adapted to be secured to the draw bar 11 of the tractor by means of a clevis 17 or any other suitable device.

Pivotally connected with one end of the bar 15 is a rearwardly extending bar 18, having near its rearward end a plurality of openings 19. Substantially in line with the bar 18, and overlapping the same at its rearward end, is a bar 20. The bar 20 is provided with a plurality of openings 21 at its forward end. The bars 18 and 20 are rigidly connected by means of bolts 22 extended through the openings 19 and 21.

Pivotally mounted on the forward bolt 22 is a rearward extended bar 23 having at its forward end a plurality of openings 24 adapted to selectively receive the forward bolt 22. Connected with the rear end of the bars 20 and 23 are clevises 25 to which the forward end of the beams 14 may be secured.

Connected to the end of the bar 15, opposite the bar 18 is a chain or other flexible device 26. The chain 26 is extended rearwardly and has one of its links secured to a hook 27 mounted on the frame of the plow 12 at a point suitably rearward of the forward ends of the beams 14. It will be understood that different links on the chain 26 may be secured to the hook 27 for varying the adjustment between the bar 15 and the frame of the plow.

In the practical use of our improved hitch, the bar 15 is secured to the draw bar of the tractor in any suitable way. The bars 23 and 20 are secured to the beams of the plows 13 by means of the clevises 25 or other suitable device. The chain 26 is hooked over the hook 27 for accommodating the plows for light or deep plowing, or adjusting them for any desired purpose. The point of adjustment of the bar 15 may be varied to secure the clevis 17 in the different openings 16 in the bar 15, thereby shifting the plows laterally with relation to the tractor.

The combined lengths of the bars 18 and 20 may be readily regulated by changing the positions of the bolts 22. The bar 23 may be shifted by selectively mounting the forward bolt 22 in different holes 24. The operation and effect of the chain 26 may be varied by changing the point on the chain 27 where such chain is attached to the frame of the plows.

There are many reasons why it is desirable to shift the plows laterally with relation to the larger traction wheel of the tractor. For instance the cut of the plows may be different in width, the plow shares being designed to cut fourteen or sixteen inches, or as the case may be. It will thus be seen that our improved hitch may be used with plows cutting different widths or furrows. It will also be noted that in working on a side hill there will be a tendency for the plows to swing laterally with relation to the tractor, and it may be desirable to shift the clevis 17 to different holes 16 for holding the plows in proper position during the plowing operation.

Assuming that the operator is plowing on a side hill inclined upwardly toward the right, the tendency of the plow to swing downwardly toward the left may be largely counteracted by adjusting the chain 26.

It will be understood that some changes may be made in the construction and arrangement of the various parts of our improved hitch without departing from its essential features and purposes, and it is our intention to cover by this application any such changes which may be included within the scope of our claim.

We claim as our invention:

In a hitch for gang plows, a bar, having means whereby the bar may be secured to a draw bar at different parts in its length, a longitudinally adjustable member secured to one end of said bar and designed to be secured to a plow beam, a member pivotally mounted on said longitudinally adjustable member and capable of longitudinal adjustment with relation thereto, said last described member being designed to be secured to a plow beam, a flexible member secured to the other end of said first bar and designed to be secured at different points in its length to the frame of a gang plow rearwardly of the forward ends of the plow.

Des Moines, Iowa, May 3, 1915.

SCOTT C. DERBY.
EMIL PETERSEN.

Witnesses:
Roy D. Grouel,
A. G. Grulke.